United States Patent [19]
Woodhead

[11] 3,761,571
[45] Sept. 18, 1973

[54] PRODUCTION OF CERIA

[75] Inventor: James Louis Woodhead, Didcot, England

[73] Assignee: United Kingdom Atomic Energy Authority, London, England

[22] Filed: Feb. 4, 1971

[21] Appl. No.: 112,783

[30] Foreign Application Priority Data
Feb. 10, 1970 Great Britain.................... 6,440/70

[52] U.S. Cl.................. 423/263, 252/317, 264/115
[51] Int. Cl............................................ C22b 59/00
[58] Field of Search........................ 23/19, 23, 183; 423/263; 252/317

[56] References Cited
UNITED STATES PATENTS
377,701  2/1888  Welsbach........................... 23/19 R 3,425,793  2/1969  Bauer et al. ...................... 23/183 X
2,332,236  10/1943  Kremers et al. ................ 423/263 X
3,346,422  10/1967  Berger ............................ 423/263 X
3,397,257  8/1968  Brambille et al. .............. 423/263 X Primary Examiner—Herbert T. Carter
Attorney—Larson, Taylor & Hinds

[57] ABSTRACT

Control over physical characteristics of product ceria is provided by a new process in the manufacture of ceria from cerium IV hydroxide. A slurry of the cerium IV hydroxide in water is treated with nitric acid and heated until the pH, which is controlled to be ultimately less than 5.4, reaches a steady value. The slurry thus conditioned is dried to give a dry gel powder.

14 Claims, 1 Drawing Figure

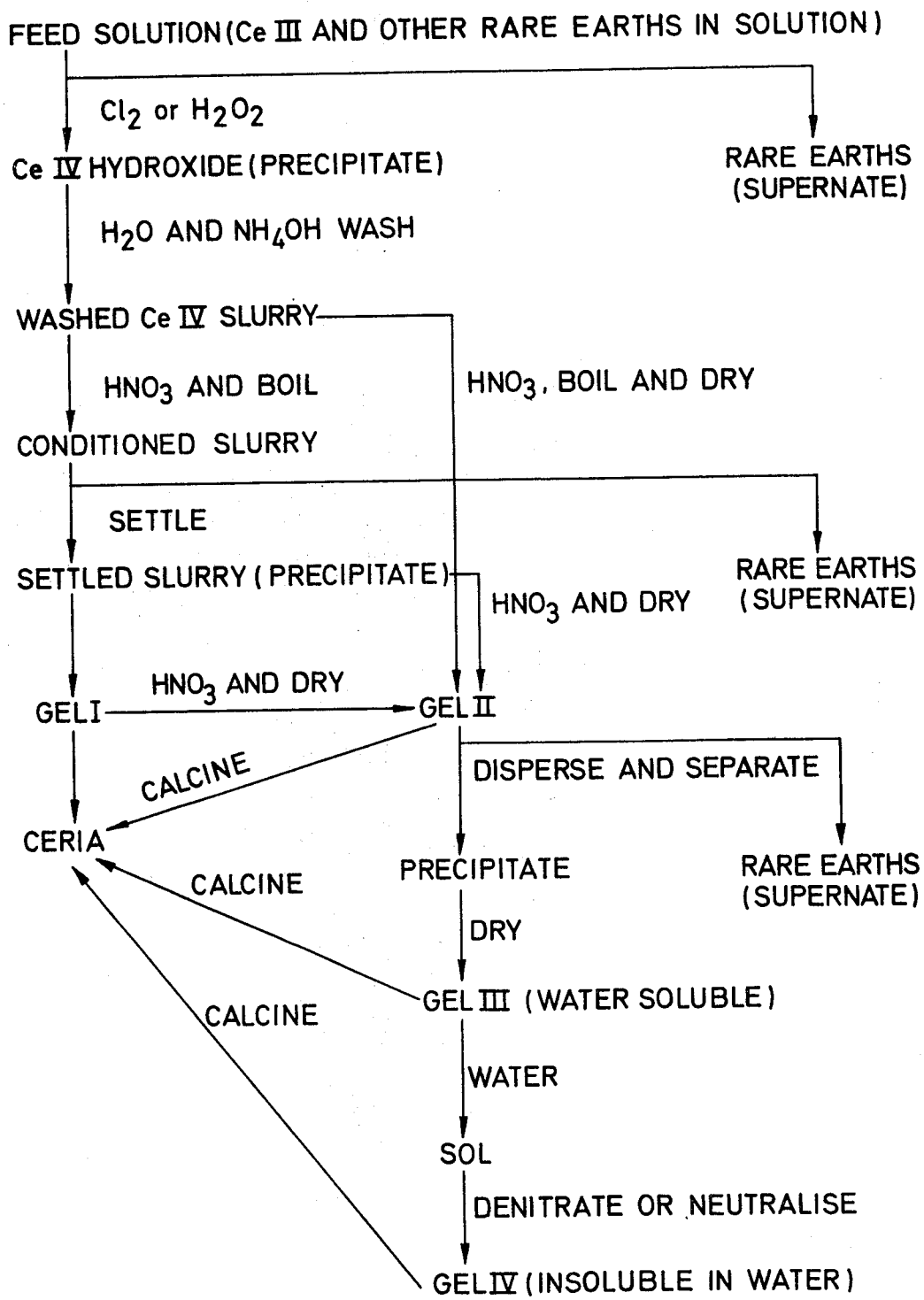

PRODUCTION OF CERIA

BACKGROUND OF THE INVENTION

The present invention relates to the production of cerium oxide, otherwise known as ceria.

It is known that ceria has many uses, for example it is a glass polishing medium, and it is also used as a filler for arc carbons in order to increase the luminous intensity of the arc. Other uses for ceria are as a high temperature refractory material. For some of these purposes it is desirable to have the ceria as dense as possible, the theoretical density being 7.3 gm per cc, but for other purposes a less dense product is required. However, what is quite clear is that under all circumstances it is extremely desirable to be able to control the final density of the fired oxide. Heretofore, ceria has been made by the calcination of water-insoluble cerium oxalate or by the calcination of water-insoluble cerium IV hydroxide, the temperatures which are used being high enough to ensure decomposition to ceria. This calcination step has heretofore given little control over the product oxide with respect to its density, shape or crystallite size.

The most usual starting material for the production of ceria is cerium IV hydroxide or cerium IV hydrate which is sometimes also called "hydrated cerium dioxide" and which is in point of fact probably a mixture of these two compounds.

One conventional production route involves taking cerium III chloride solution (usually containing other rare earth chlorides) and oxidising it with chlorine gas to effect the precipitation of the insoluble cerium IV hydroxide. At the same time a separation step is carried out, since other rare earth compounds remain in solution as the trivalent chlorides. The precipitated cerium IV hydroxide is then washed with water until substantially freed from soluble salts (e.g. sodium chloride). The precipitate is then given a final wash with alkali, preferably ammonium hydroxide, to fix any remaining rare earth salts, other than ceria, as hydroxides, and the cerium IV hydrate is then filtered off. The cerium IV hydroxide is then calcined to the oxide at about 1,000° C. If it is required in a more pure form, the cerium IV hydroxide can be dissolved in hydrochloric acid and cerium III oxalate can be precipitated with oxalic acid and this oxalate then calcined to the oxide.

It is a prime object of the present invention to provide a process for the production of ceria which enables control to be exercised over the final product. It will be appreciated that density depends to a great extent on crystallite size, particle size and other factors, all of which therefore are controlled at least to a secondary degree by the process of the present invention.

SUMMARY OF THE INVENTION

According to the present invention, there is provided a process for the manufacture of ceria from cerium IV hydroxide comprising forming the cerium IV hydroxide into a slurry with water and nitric acid; heating the slurry for such a time and at such a temperature that the pH reaches a steady value, the quantity of nitric acid being such that the said steady value of pH is below 5.4, thereby to produce a conditioned slurry, and drying such conditioned slurry to give a dry gel powder.

Thus in more detail, in the process of the present invention, cerium IV hydroxide is precipitated as above described (page 2, line 25 to page 3, line 10) and then washed. Washing should preferably be continued until the final wash water has a specific conductivity of not greater than $5 \times 10^3$ μmhos and a pH value between 7 and 8.5. As is conventional in the art, hot washing may be effected at a temperature of approximately 90° C but the final precipitate ought not to be dried if the present invention is to be carried into effect.

After the cerium IV hydroxide has been prepared and washed as above described, it is then mixed with a controlled amount of nitric acid and water and formed into a slurry. On adding the nitric acid, the pH drops rapidly to between 1.5 and 0.5 and then rises slowly as heating is continued. The heating should be continued until the pH is stable and below 5.4. For polishing powders it is important that this stable level of pH should not be below 3.8 and preferably lies between 4.4 and 3.8. For high density ceria or ceria sols the stable level of pH reached should preferably be below 1.5.

The time required for the heating step naturally depends on the temperature. We prefer to use a temperature in excess of 90° C and 100° C is convenient. At this temperture a heating time in excess of 15 minutes is probably desirable and we use 1 hour for safety. Thus we prefer that the acid slurry is maintained at a temperature in the region of 100° C for a time of at least 1 hour to give the "conditioned slurry," the most convenient process step being to boil the slurry for this length of time. The proportion of nitric acid used in this boiling stage controls the final product and this is true even though the nitric acid that remains after the boiling stage is removed, as will be described hereinafter. The amount of nitric acid that has to be added depends on the final pH value required and also on the proportion of rare earth oxides (other than ceria) in the cerium IV hydroxide.

It is desirable to allow the conditioned slurry to cool and settle when a "settled conditioned slurry" can be separated from the supernatant liquor by decantation, pumping or the like.

Table I shows the relationship between ratio of nitric acid to ceria, initial pH and final pH.

TABLE I

| Initial slurry | | Settled conditioned slurry | | | Tap density | |
|---|---|---|---|---|---|---|
| HNO₃/oxide (mole ratio) | pH | pH | Density, g./cc. | Concn., g./l. | Gel, g./cc. | Oxide, g./cc |
| Nil | 8.2 | 8.2 | 1.18 | 203 | 1.00 | 1.15 |
| 0.25 | 1.5 | 5.4 | 1.23 | 290 | 1.05 | 1.30 |
| 0.32 | 1.3 | 3.8 | 1.33 | 375 | 1.20 | 1.50 |
| 0.53 | 1.0 | 1.6 | 1.38 | 420 | 1.80 | 2.80 |
| 1.0 | 0.5 | 0.9 | 1.48 | 526 | 2.00 | 3.10 |

In Table I, the first column shows the proportion of nitric acid to oxide (about 90 percent cerium oxide, rest rare earth oxides) by moles and is based on an analysis of the actual oxide content. In many cases there will be a variable amount of other rare earth oxides so that it is not safe to rely on adding a fixed proportion of nitric acid in the absence of an analysis or a pH measurement. The nitric acid does not effect dissolution of the cerium IV hydroxide, but alters the physical characteristics of the slurry to a marked extent as can be seen from columns 3, 4 and 5 of Table I. Further evidence of the control upon the physical characteristics of the slurry by the nitric acid employed in accordance with the invention has been shown by electron micrographic analysis. This evidence is discussed in more detail hereinafter.

After settling for 24 hours the figures shown in the table for the "settled conditioned slurry" are obtained and it will be observed that the mixture separates into a slurry and supernatant liquor and the slurry has an increasing density with increasing nitric acid concentration and also, as might be expected, an increasing concentration of ceria. When the nitrate to ceria molar ratio is greater than 1:1, there is an excessive dissolution of the cerium into the supernate as a trivalent compound and this leads to an excessive loss of cerium so that in practice equimolar represents the maximum useful proportion of nitric acid if separation from rare earths other than ceria is to be effected. This supernatant liquor contains some of the rare earth oxides other than cerium which are present in the initial raw material. If the hydrate which is used as the starting material contains approximately 10 percent by weight of rare earth oxides other than ceria, the settled phase in the conditioned slurry obtained after the boiling with nitric acid as above described contains normally less than 5 percent of these other rare earth oxides.

The slurry which is obtained after the boiling stage may be dried at a convenient temperature such as 105° C to give a dry gel powder and as will be seen from column 6 of Table I the density of this gel powder varies in a marked way in dependence upon the nitric acid concentration during the boiling stage. In fact we prefer to use spray drying of the slurry as the best way of converting the slurry into a dry powder and to effect this in a conventional stainless steel spray dryer under such conditions that the outlet temperature is about 105° C. The temperature, it should be explained, is not critical. Preferably the drying conditions are such that the gel powder contains 83–90 percent oxide as determined by weight loss on calcination.

The gel powder is then conventionally fired at a temperature which is conveniently 950° C and the final column in Table I shows the final densities obtained. It should be explained that the above densities are obtained after tapping for a specified number of times in a graduated tube using a fine (5–25 μm) starting powder.

It is to be emphasised that the present invention depends critically upon the use of nitric acid and that other common acids are not suitable for use. Thus hydrochloric acid would react with the cerium IV species present to give chlorine. Other acids such as hydrofluoric acid react with the cerium IV to give insoluble compounds and finally sulphuric acid in excess of that required to dissolve the entrained rare earths other than ceria dissolves a large proportion of the ceria and gives no effect on the final densification.

Neither the settled slurry nor the gel powder is soluble in water to any marked extent. However, the process of the invention is based on the discovery that the heating with nitric acid modifies the physical characteristics of the product, and this process of modification can be carried further. Thus if the settled slurry is treated with more nitric acid and heated and then evaporated to dryness, the product is a further gel of higher density. This gel is dispersible in water to give a semi-transparent sol, but not in nitric acid which coagulates the sol. If therefore this gel is dispersed in water and the concentration is such that the nitrate ion content is sufficient to cause coagulation, essentially the whole of the ceria is precipitated but other rare earths remain in solution. This precipitate may be removed and dried to give a transparent gel, which contains less nitrate ions than the higher density gel.

The trasparent gel is soluble in water and the above described steps may possibly be repeated on it. However, for practical purposes the transparent gel is soluble to give a sol which can be dried to go back to the transparent gel ad infinitum.

The sol can be suspended in an inert organic phase and water extracted from it to give spheres of the transparent gel or nitric acid can be extracted to give spheres of a nitric acid-deficient gel which is insoluble in water.

All of the gels can be calcined to ceria.

It will be appreciated that the difference between the gels is the nitric acid content. It is possible to go directly from the conditioned slurry to a higher density gel by ensuring that there is sufficient nitric acid present during the preparation of the conditioned slurry and then drying this conditioned slurry without effecting removal of the supernate. This form of higher density gel will, of course, contain more rare earths than that prepared by separate steps. It also follows that since there is no separation effected on the conditioned slurry, it is possible to use more nitric acid than equimolar.

The extents of the modification or control of physical characteristics of the product by the controlled nitric acid treatment have not been fully evaluated. However, the control upon density is apparent from the above discussion and it is observed that good quality polishing powders may be produced from the product gels, provided the addition of nitric acid is so controlled during the process that the steady pH value reached after heat treatment is not less than 3.8 and preferably lies between 4.4 and 3.8.

Electron micrographs have been made of typical examples of the transparent gel and also of a sample of "unconditioned" cerium IV hydroxide slurry — that is a slurry in water of cerium IV hydroxide prior to the nitric acid treatment.

Examination by electron microscopy showed the transparent gel to consist of particles approximately 100 A in diameter whereas cerium IV hydroxide before treatment with nitric acid consisted of particles about 1000 A in diameter. X-ray examination indicated both the transparent gel and unconditioned ceria hydrate had an average crystallite size of approximately 100 A. Thus the treatment with nitric acid breaks down aggregation of the crystallites to a very significant extent.

When the dried ceria hydrates are calcined, crystallite growth occurs and it is believed that the crystallite size distribution in the calcined ceria is important in determining the glass polishing properties. Thus the control of the physical properties before the calcination step are particularly important. This illustrates the value in one aspect of the process of the present invention.

DESCRIPTION OF PREFERRED EMBODIMENTS

Several examples embodying the present invention will now be described.

EXAMPLE 1

A paste of washed cerium IV hydroxide was diluted with water to give 253 l of a thin slurry (pH 8.2) containing 18.45 kg of oxide (including 1.84 kg of rare earth oxides other than ceria). To this stirred slurry 2.02 l of 16M nitric acid were added to give a nitrate/oxide mole ratio of 0.30:1 and pH value 1.3 and the whole mass heated to 100° C and held at that temperature for 1 hour. The slurry then had a pH value of 3.8 and was allowed to cool and settle for 24 hours and a clear supernate (165 l) was removed; this supernate had a pH of 3.8 and contained 0.85 kg of rare earth oxides free from ceria. A creamy, limpid "conditioned" slurry (471 l) free from lumpy material (unlike the original untreated slurry) was left in the tank. The conditioned slurry was found to contain 375 g/l of oxide and had a density of 1.33 g/cc. This slurry was spray dried in a stream of hot air in a spray drier at 105° C exit temperature to give a particulate dry gel powder in the size range 5–25 μm. The gel has a tap density of 1.20 g/cc and contained 88.5 percent oxide. This gel was calcined in air at 950° C to an oxide with a tap density of 1.50 g/cc which had good glass polishing properties.

EXAMPLE 2

The procedure of Example 1 was repeated with varying amounts of nitric acid, with the results set out in Table II.

TABLE II

| Weight of oxides, kg. | 16M nitric acid, litres | Nitrate/oxide, mole ratio | Initial pH | Final pH | Slurry density | Gel density | Oxide density |
|---|---|---|---|---|---|---|---|
| 24 | 2.18 | 0.25 | 1.5 | 5.4 | 1.23 | 1.05 | 1.30 |
| 0.25 | 0.03 | 0.33 | 1.3 | 4.2 | 1.25 | 1.10 | 1.45 |
| 0.25 | 0.05 | 0.53 | 1.0 | 1.6 | 1.38 | 1.80 | 2.80 |

In these experiments the nitrate/oxide mole ratio was estimated by the oxide content of the feed solution. For the large scale run distilled water was not used and a proportion of nitric acid was used in reaction with the water. Control was effected by monitoring the final pH.

EXAMPLE 3

A paste of washed cerium hydroxide was diluted with water to give 249 l of a thin slurry (pH 8.2) and containing 25.8 kg of oxide (including 2.60 kg of rare earth oxides other than ceria). This slurry was mixed with 9.0 l of 16M nitric acid to give a nitrate/ceria mole ratio of 0.98:1.0 and initial pH of 0.5 and the whole mass stirred and held at 100° C for 1 hour. The slurry was allowed to cool and settle for 24 hours. A pale yellow supernate (150 l) was then removed; this supernate had a pH of 0.9 and contained 2.16 kg of rare earth oxides including 0.51 kg of ceria. The conditioned slurry (45 l) which was creamy and free from lumps had a density of 1.48 g/cc and contained 526 g/l of oxide. After spray drying at 103° C exit temperature to particulate matter in a size range of 5–25 μm, this gel had a tap density of 2.0 and contained 83.9 percent oxide. When calcined in air at 750° C it yielded an oxide with a tap density of 3.1 g/cc.

The excellent flow properties of this oxide powder were used to facilitate the flame spraying (using a plasma gun) of stainless steel plates with a coating of ceria. The high density of the product enabled artefacts of high "green", i.e., unfired, density to be formed.

EXAMPLE 4

A fraction (1.8 l containing 0.94 kg of oxide) of the conditioned slurry obtained in Example 3 was mixed with 93.5 ml of 16M nitric acid and evaporated to dryness in a tray at 105° C. 1.35 kg of a shiny material were obtained which contained 82.5 percent oxide, 14.5 percent nitrate ($NO_3$/oxide mole ratio = 0.48). This gel was crushed to a fine powder and dispersed in 6 l of hot water. When the concentration reached a limiting value, a precipitate formed containing essentially all the ceria and this was separated by centrifuging. The supernatant liquor contained 58.5 g of rare earth oxide (free from ceria) and 86.5 g of nitrate. The residue was evaporated at 105° C to yield hard transparent gel ((0.98 kg) which contained 89.5 percent oxide and 7.9 percent nitrate ($NO_3$/oxide mole ratio = 0.24). This transparent gel III would disperse in water to give a semitransparent sol containing 500 g/l of oxide and could be reversibly evaporated and dispersed. When calcined, this gel decomposed to give large glassy fragments of ceria.

EXAMPLE 5

An alternative route for the production of a higher density gel is also possible. Thus 105 ml of the washed cerium IV hydroxide slurry (containing 51 g of oxide) were mixed with 10 ml of 16M nitric acid to give a nitric to oxide mole ratio of 0.54. The mixture was stirred for 5 minutes and became quite viscous. It was then heated by being placed in an oven held at 120° C and remained there for 16 hours until dry.

The product was a glassy, reddish-brown material with a distinct glitter. The gel was crushed to between 63 μm and 400 μm and found to have a tap density of 2.5. After calcination at 750° C, the tap density was 3.6 and the mercury density 5.6.

EXAMPLE 6

An alternative route for the production of the sol is to take the dry gel powder obtained after spray drying. A dispersion of this dry gel powder was treated by boiling with a small amount of 16M nitric acid, e.g. 83 ml per kg; a precipitate was formed which was separated from the supernatant liquid (containing rare earths) and the precipitate was dried to give a hard transparent gel similar to the transparent gel obtained in Example 4 and which was soluble in water to give a sol.

EXAMPLE 7

The concentrated sols produced by Examples 4 and 6 were dispersed in immiscible organic solvents such as carbon tetrachloride or 1.1.1 trichloroethane and then converted to spherical "gel" particles in a range of sizes from 25 μm to 2500 μm diameter by known techniques. This conversion can be effected by withdrawing water using a solvent such as 2-ethyl hexanol to give a gel which is essentially the same as the transparent gel above described, being soluble in water. Alternatively the conversion can be effected by withdrawing nitric acid using an amine or neutralising with ammonia gas to produce gel spheres which are nitric acid-deficient and insoluble in water.

Table III shows the effect on density of calcining particles of transparent gel (200–400 μm) in air.

TABLE III

| Calcination temperature, °C. | Density in mercury, g./cc. |
|---|---|
| 22 | 4.06 |
| 105 | 4.25 |
| 200 | 4.56 |
| 400 | 4.80 |
| 600 | 5.05 |
| 800 | 5.45 |
| 1,000 | 5.80 |

The sol has considerable potential for preparing mixtures by adding other components as sols or solutions and also as "binders" for preparing artefacts.

The spherical particles present the ceria in an ideal form for catalytic uses where attrition should be kept to a minimum.

EXAMPLE 8

In order to demonstrate the marked effect of the nitric acid treatment, the washed cerium IV hydrate slurry of pH 8.2 of Example 1 was spray dried under identical conditions to those used for spray drying the conditioned slurry. The product was a very light fluffy powder which was difficult to handle or pass through a 63 μm sieve even after calcining and which was inferior as a polishing powder.

EXAMPLE 9

In order to demonstrate the effect of nitric acid concentration on performance as polishing powders, samples of calcined ceria from Examples 1, 2, 3, 4 and 8 were subjected to standard glass polishing tests by measuring the time required to polish a lens blank to a given standard and also by measuring the scratches produced on a polished lens. The "quality" of the polishing slurry and the handling properties of the powder were also assessed. For comparison a standard glass polishing ceria powder "Cerirouge 90," manufactured by Thorium Ltd., was also used. The results are shown in Table IV.

can also be varied by varying the concentration of the slurry fed to the spray dryer. Thus samples of the conditioned slurry from Example 2 (known to give good polishing performance) were concentrated by allowing to stand for 2 weeks and aliquots diluted with water to give a range of concentrations. The slurries were then spray dried under standard conditions (inlet 250° C, outlet 105° C), the gels tested for density and the calcined for 1 hour at 1,000° C. Table V summarises the results.

TABLE V

| Slurry concentration g/l | Density g/cc | T.D. Gel | T.D. Oxide | % oxide in gel |
|---|---|---|---|---|
| 644 | 1.63 | 1.17 | 1.66 | 89.5 |
| 526 | 1.49 | 1.09 | 1.65 | 89.4 |
| 351 | 1.32 | 1.10 | 1.48 | 88.9 |
| 260 | 1.23 | 1.05 | 1.43 | 88.0 |

I claim:

1. A process for use in the manufacture of ceria from cerium IV hydroxide comprising heating a slurry of cerium IV hydroxide and water in the presence of nitric acid until the pH reaches a steady state value below 5.4, thereby to produce a conditioned slurry, and drying said conditioned slurry to give a dry gel powder.

2. A process as claimed in claim 1, wherein the cerium IV hydroxide is prepared for use in the process by precipitation from a solution of a cerium salt, and washing until the final wash water has a specific conductivity of not greater than $5 \times 10^3$ μmhos and a pH value between 7 and 8.5.

3. A process as claimed in claim 1, wherein the nitric acid is in a quantity for the steady value of pH reached after heating to be not less than 3.8.

4. A process as claimed in claim 1, wherein the nitric acid is in a quantity for the steady value of pH reached after heating to lie between 3.8 and 4.4.

5. A process as claimed in claim 1, wherein the nitric acid is in a quantity for the steady value of pH reached after heating to be less than 1.5.

6. A process as claimed in claim 1, wherein heating of the slurry is carried out in the region of 100°C for at least 1 hour.

TABLE IV

| Product | pH of conditioned slurry | Powder handling properties | Polishing test of— 3 min. | 4 min. | 5 min. | Scratch test, scratches | Quality |
|---|---|---|---|---|---|---|---|
| Cerirouge 90 | (¹) | Average | | | Fairly good | 40 | Pass. |
| Example: | | | | | | | |
| 8 | 8.2 | Very difficult | | Fairly good | | | Good. |
| 2 | 5.4 | Difficult | Fairly good | Good | | 0 | Very good. |
| 2 | 4.2 | Good | do | do | | 0 | Do. |
| 1 | 3.8 | do | do | do | | 0 | Do. |
| 2 | 1.6 | Very good | Orange peel | | Not clear | | Just failed. |
| 3 | 0.9 | Excellent | | Glazed finish | | | Failed. |
| 4 (transparent gel) | | do | Burn marks | | Fairly good | | Just passed. |

¹ Unconditioned slurry, no nitric acid treatment.

This table demonstrates the superiority of some of the products of this invention to either "Cerirouge 90" or that of Example 8 and also shows the preferred range of nitric acid addition.

EXAMPLE 10

Example 9 demonstrates the preferred range of pH to give good polishing powders and, as explained above, this range normally corresponds to a range of densities of the final product. However, final product densities 7. A process as claimed in claim 1, wherein, prior to drying, the conditioned slurry is allowed to settle and is separated from the supernatant liquor.

8. A process as claimed in claim 1, wherein the quantity of nitric acid lies in the range 0.25 to 1.00 mole of nitric acid per mole of cerium IV hydroxide.

9. A process as claimed in claim 1, wherein the dry gel powder is treated with more nitric acid, heated and evaporated to dryness to give a gel product.

10. A process as claimed in claim 9, wherein said gel product is dispersed in water, the nitric acid concentration is adjusted to cause coagulation, the supernatant liquor is removed, and the coagulated material dried to give a transparent gel.

11. A process as claimed in claim 10, wherein said transparent gel is dispersed in water to form a sol, the sol is suspended in an organic phase and water extracted from the suspended sol to produce spheres.

12. A process as claimed in claim 10, wherein said transparent gel is dispersed in water to form a sol, and nitric acid is extracted from the sol to produce as a precipitate an acid-deficient gel.

13. A process as claimed in claim 12, wherein prior to extraction of nitric acid, the sol is suspended in an organic phase, whereby, upon extraction of nitric acid, spheres are produced.

14. A process as claimed in claim 1 wherein the dry gel powder is calcined to give ceria.

* * * * *

UNITED STATES PATENT OFFICE
CERTIFICATE OF CORRECTION

Patent No. 3,761,571  Dated September 18, 1973

Inventor(s) James Louis Woodhead

It is certified that error appears in the above-identified patent and that said Letters Patent are hereby corrected as shown below:

Column 1, line 57, after "for" insert ...use in...

Column 2, line 22, "temperture" should read ...temperature...

Column 5, line 9, "(471 1)" should read ...(47 1)...

Column 5, line 15, "has" should read ...had...

Column 6, line 10, after "yield" insert ...a...

Column 6, line 13, delete "III"

Column 7, line 42, '90,"' should read ...90",...

Table IV, Heading of second column should read
...pH of slurry...

First line in column 2 of Table, delete "(1)"

Example 8, second column should read "(1)8.2"

Delete the drawing.

Signed and sealed this 3rd day of December 1974.

(SEAL)
Attest:

McCOY M. GIBSON JR.
Attesting Officer

C. MARSHALL DANN
Commissioner of Patents